United States Patent
Bergstrom et al.

(10) Patent No.: US 6,817,433 B1
(45) Date of Patent: Nov. 16, 2004

(54) CAB-OVER-ENGINE VEHICLE WITH A NON-TIPPABLE CAB

(75) Inventors: Åke Bergstrom, Mariefred (SE); Pär Wallin, Järna (SE); Michael Linden, Södertälje (SE); Fredrik Modahl, Norsborg (SE); Anders Gustavsson, Gnesta (SE)

(73) Assignee: Scania CV AB (Publ) (SE)

( * ) Notice: Subject to any disclaimer, the term of this patent is extended or adjusted under 35 U.S.C. 154(b) by 0 days.

(21) Appl. No.: 10/089,597
(22) PCT Filed: Sep. 28, 2000
(86) PCT No.: PCT/SE00/01874
§ 371 (c)(1), (2), (4) Date: Jul. 12, 2002
(87) PCT Pub. No.: WO01/23247
PCT Pub. Date: Apr. 5, 2001

(30) Foreign Application Priority Data

Sep. 29, 1999 (SE) ................................. 9903517

(51) Int. Cl.$^7$ ........................... B62D 33/06; B62D 39/00
(52) U.S. Cl. .................................. 180/89.12; 180/89.17
(58) Field of Search ................ 180/89.12, 89.17–89.19, 180/89.1

(56) References Cited

U.S. PATENT DOCUMENTS

| | | | | |
|---|---|---|---|---|
| 2,157,793 A | * | 5/1939 | Lang ........................... | 280/848 |
| 2,769,503 A | | 11/1956 | Wagner ........................ | 180/89 |
| 2,868,310 A | | 1/1959 | Lee .............................. | 180/89 |
| 3,217,354 A | * | 11/1965 | May ............................ | 16/338 |
| 3,224,525 A | * | 12/1965 | Froitzheim et al. ...... | 180/89.19 |
| 4,339,016 A | * | 7/1982 | Gerresheim .............. | 180/89.17 |
| 5,327,988 A | * | 7/1994 | Lenz et al. ............... | 180/89.18 |
| 5,984,037 A | * | 11/1999 | Duhem ..................... | 180/89.17 |
| 6,179,312 B1 | * | 1/2001 | Paschke et al. ........... | 280/166 |

FOREIGN PATENT DOCUMENTS

| | | |
|---|---|---|
| DE | 19639661 | 4/1998 |
| GB | 802178 | 10/1958 |
| GB | 895525 | 5/1962 |

* cited by examiner

Primary Examiner—Teri P. Luu
Assistant Examiner—Bret Hayes
(74) Attorney, Agent, or Firm—Ostrolenk, Faber, Gerb & Soffen, LLP

(57) ABSTRACT

Cab-over-engine freight vehicle with a driver's cab which is untiltable relative to the chassis and is situated above the vehicle's engine which is supported by the chassis. On each side of the vehicle there is a panel which is provided with steps, delineates the engine compartment laterally and is mounted pivotably on the chassis by means of a panel control arrangement which makes it possible to impart a displacement movement to the panel so that it swings outwards and rearwards in the longitudinal direction of the vehicle to an engine access position. Below the door of the driver's cab there is a cover which is hinged-mounted on the chassis and which in the closed position conceals the step panel situated inside it. The cab door and the cover below the door are detachably coupled with one another by a relative-motion absorbing control arrangement.

24 Claims, 5 Drawing Sheets

CAB-OVER-ENGINE VEHICLE WITH A NON-TIPPABLE CAB

The present invention relates to a cab-over-engine (COE) freight vehicle which has a chassis and a driver's cab which is mounted untiltably on the chassis and situated above the vehicle's engine, which is supported by the chassis.

STATE OF THE ART

Trucks may be divided into the two categories of "conventional trucks" and "COE trucks". Conventional trucks have their engine situated in front of the driver's cab and covered by a traditional bonnet which incorporates portions and panels/hatches which are easy to open (pivotable aside) so that the engine is readily accessible for inspection and repair. At a given total vehicle length, however, this tandem positioning of the engine and the driver's cab results in occupation of part of the space in the longitudinal direction of the vehicle which could otherwise be used as load space. This limits the truck's load capacity, thereby impairing its transport economics.

To enable a larger proportion of a given total vehicle length to be used as effective load space, the trend has increasingly been towards building freight vehicles in the form of COE trucks, in which the driver's cab is situated over the engine. Part of the portion of the vehicle's total length which in conventional trucks is occupied by the engine and bonnet can therefore be utilised in COE trucks as load space, substantially increasing the vehicle's load capacity and improving its transport economics.

The fact that COE trucks have their engine situated under the floor of the driver's cab makes it necessary in practice for the cab to be tiltable forwards to enable the engine to be uncovered as necessary for servicing and repair purposes. A tiltable cab does entail, however, significant design problems due to the need for a special tilt mounting, mechanisms for locking the cab in the untilted driving position, and various devices which make the tilting movement possible and transmit motion between controls fitted in the cab (e.g. steering wheel, pedals, hand-operated controls etc.) and the front wheels, engine/gearbox, wheel brakes and other equipment mounted on the chassis. A further need is for flexible and stretchable wiring for transmitting electric current and control signals between the driver's cab and the chassis and the equipment mounted on the chassis.

OBJECT OF THE INVENTION

The primary problem on which the invention is based is how to eliminate entirely the aforesaid design problems arising from the driver's cab being tiltable and at the same time provide the possibility of satisfactory access to the engine for servicing and repair, from either side of the vehicle, while still maintaining the COE truck's "compactness" as regards the total cab/engine length.

An associated object of the invention is to provide a freight vehicle in which the wall elements which delineate the engine compartment laterally and are connected to and/or mounted on the chassis (e.g. panels, hatches etc), and other vehicle parts (e.g. steps) alongside the engine, are easy to move out of the way or aside or to open so as to provide good access to the engine from both sides of the vehicle.

DESCRIPTION OF THE INVENTION

In the kind of vehicle indicated in the introduction, the aforesaid problem is solved and the object achieved by the vehicle's exhibiting the constructional features of a vehicle having a chassis with an engine on the chassis on a driver's cab mounted above the chassis and particularly non-tiltably above the chassis. The engine is in an engine compartment on the chassis. At each lateral side of the vehicle at each lateral side of the engine compartment, there is a panel that laterally delineates the engine compartment and the panel is pivotally mounted on the chassis to pivot open. There may be a user accessible step on the outside of the panel. The panel is displaceable by outward pivoting and rearward movement in the longitudinal direction of the vehicle to allow access to the engine. A cover is pivoted to the chassis at a hinge at about the same longitudinal direction position as the door hinge. The cover closes over the panel. A control arrangement joins the cab door and the cover to swing open and closed together and accommodates relative motion between the cab door and the cover.

Each side of the vehicle thus requires at least one panel which not only delineates the engine compartment laterally but may possibly also be provided with one or more steps and is attached by means of a special panel guide mechanism or guide which enable the panel to be pivoted outwards from the vehicle's centreline and rearwards in the longitudinal direction of the vehicle to a displaced position in which the panel no longer hinders the direct access to the engine required for carrying out engine repair or inspection/servicing.

Preferred and advantageous embodiments of the freight vehicle according to the invention may also exhibit the further features indicated by the dependent patent claims.

In cases where the freight vehicle's chassis incorporates a frame structure in the form of a beam frame, a COE vehicle's engine will usually be situated at least partially between the parallel frame side members, particularly if the latter extend to the forward bumper at the front of the driver's cab.

To make access to the engine from the sides still easier in such cases, it is possible to have the frame side members ending in the region immediately to the rear of the rear of the engine. The engine is then not fitted between the frame side members but advantageously in a special arrangement which may consist of a beam structure or framework structure and which is designed to provide good access to the engine from both sides. The chassis incorporates a framework structure and a suspension arrangement supporting the engine is fastened to the forward end of the frame structure.

If the panel delineating laterally the engine compartment is provided with external steps to help the driver climb up to/down from the cab, it is often desirable that these steps be concealed behind a special cover while the vehicle is in motion, to prevent the possibility of loose material (e.g. sand, gravel or small stones) accumulating or being caught on the steps, and also to help to reduce air resistance by providing the vehicle/driver's cab with more effective streamlining to reduce the risk of vortices that might generate resistance and cause dirt to adhere to the steps.

To ensure that the aforesaid cover which in the closed position (e.g. while the vehicle is in motion) conceals the panel which carries the steps will automatically pivot away and uncover the steps when the cab door is opened, it is advantageous to have the cab door movement initiate and control the movement of the cover. The cab door and the cover over the panel are detachably coupled so that they can be opened and closed together. There is a relative motion control absorbing arrangement between them allowing some relative movement between the cab door and the cover to compensate for cab springing and for different hinged pin positions for the door and cover.

To avoid any risk of the driver's being hindered by the cover when he is climbing up to/down from the cab, it may be advantageous that the cab door and the associated cover be attached and to have the cover and the door of the cab being supported on respective hinge pins that are at different locations with respect to the longitudinal direction on the vehicle, and particularly with the hinge pin of the cover being situated slightly forward of the door hinged pin.

A simple and robust version of the associated control arrangement is described below.

To provide optimum access to the vehicle engine for servicing and repair, it is preferable that the panel control arrangement be such that the panel can reliably move completely clear of the aperture which the cover coupled to the cab door uncovers as the door and cover open. An advantageous displaced position for the panel is then close to and alongside the vehicle's front wheel, with the panel "parked" parallel to the outside of the wheel.

A practical version of the panel control arrangement may then exhibit, for example, a hinged pin and pivot arrangement described below.

BRIEF DESCRIPTION OF THE DRAWINGS

The invention will now be illustrated and explained with reference to embodiments depicted in the attached drawings, which are as follows.

DESCRIPTION OF AN EMBODIMENT

Figure 1A:
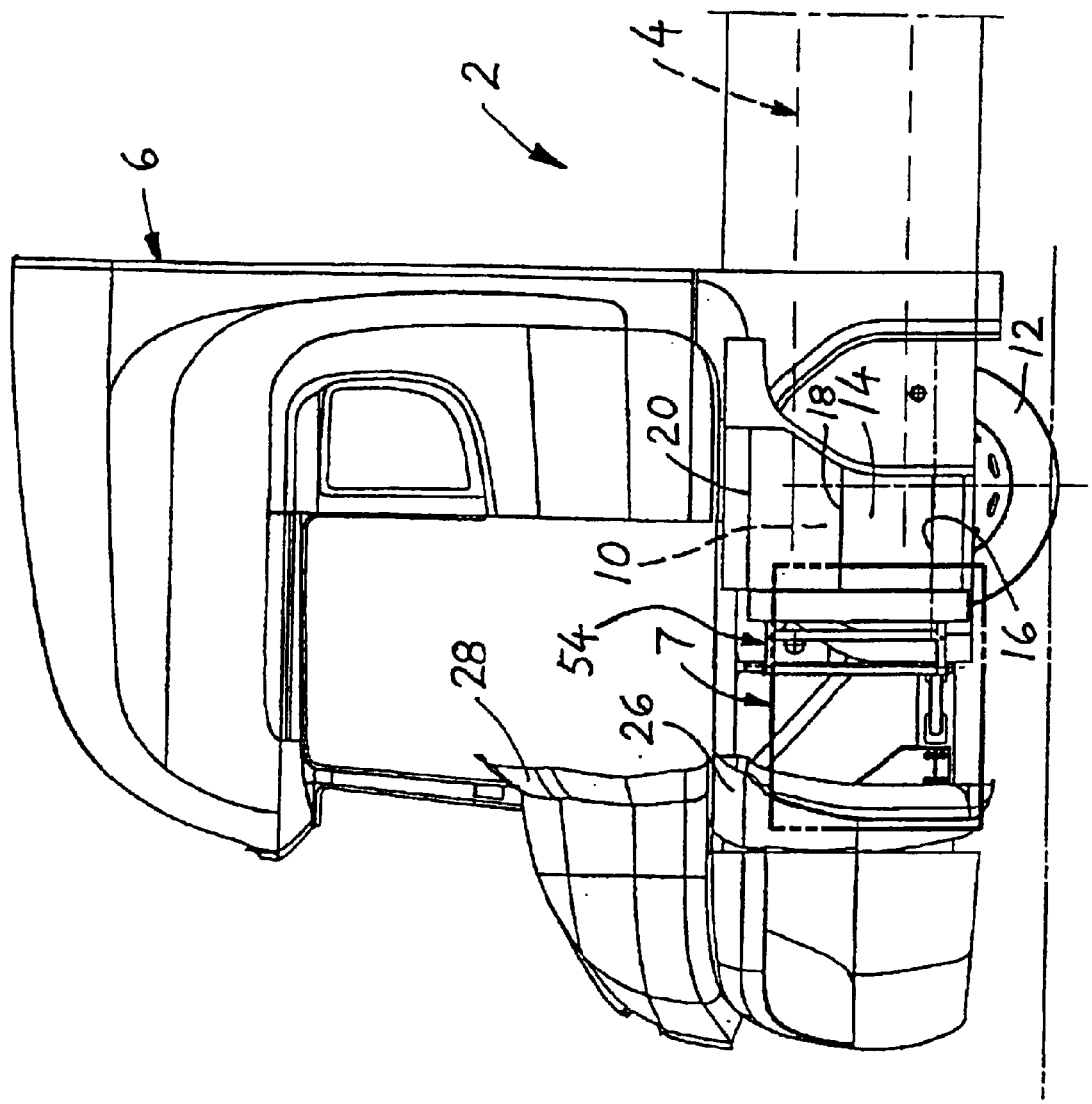
FIG. 1a depicts in schematic side view a COE truck with constructional features according to the present invention.
Figure 1B:
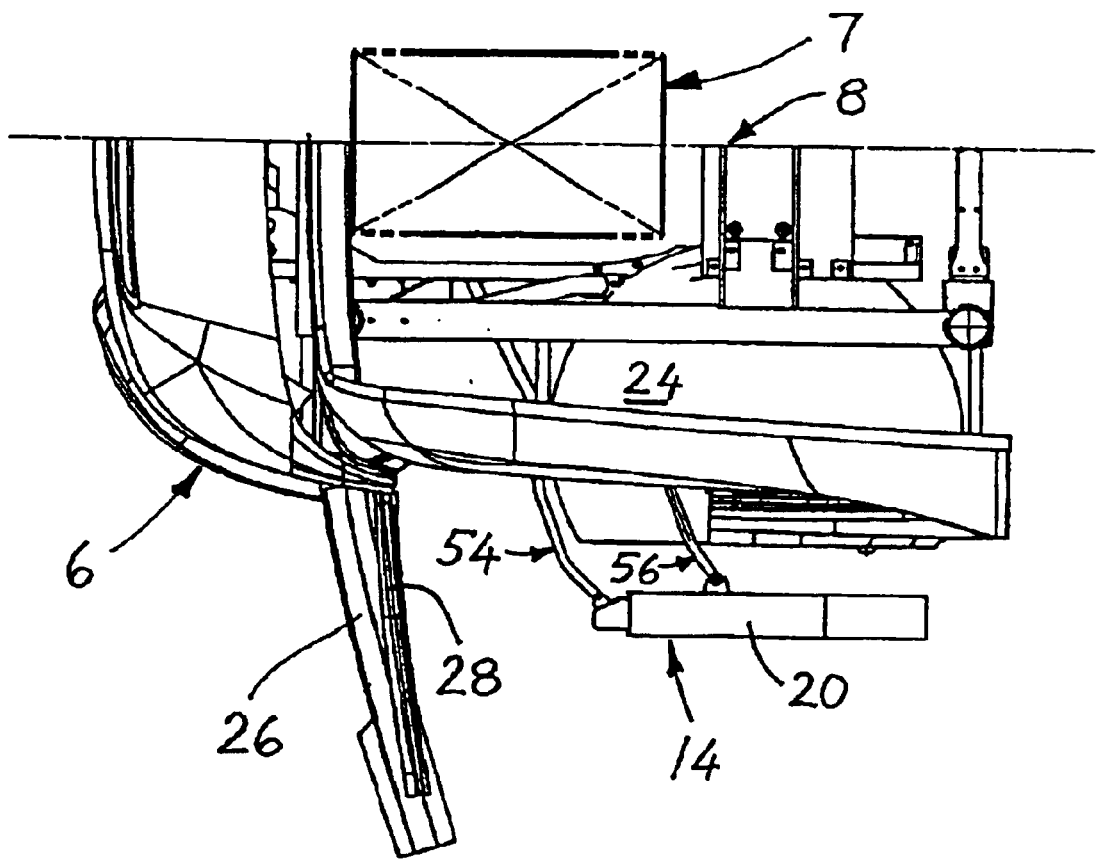
FIG. 1b depicts the left half of the driver's cab in FIG. 1a, viewed from above.
Figure 2:
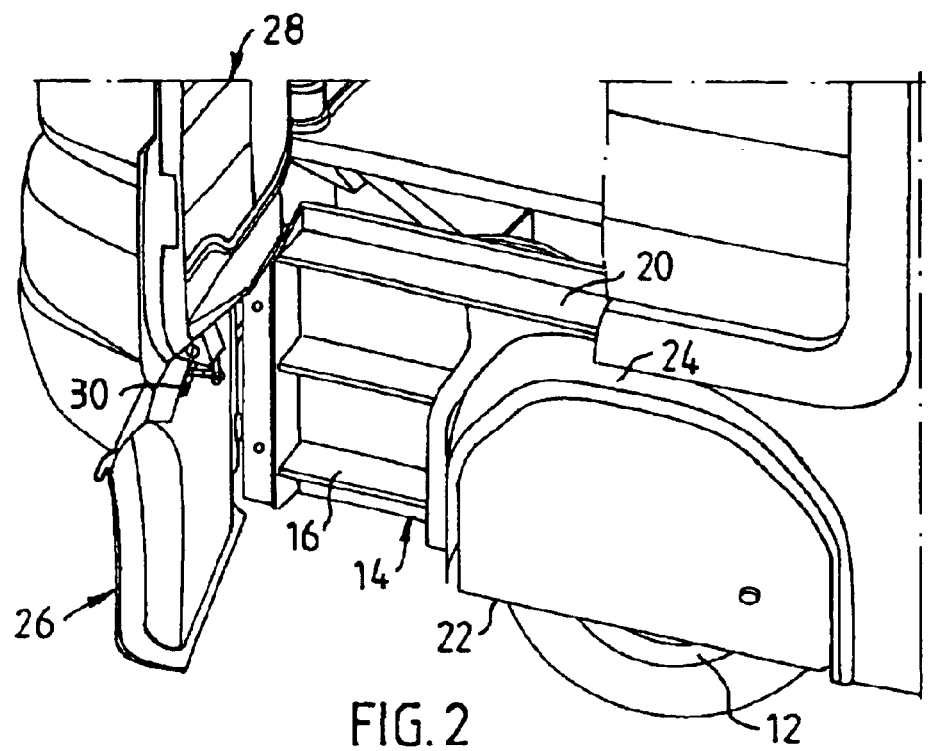
FIG. 2 depicts on a larger scale and in perspective a portion of a truck (of the kind depicted in FIG. 1) in the region of one of the cab's door apertures and the steps situated below.

The invention is illustrated and explained in more detail below with reference to the driver's cab region of a COE (cab-over-engine) truck depicted as viewed from the side and from above in FIGS. 1a and 1b respectively, and the portions and parts depicted in FIGS. 2–7 which are primarily relevant to the invention.

The freight vehicle partially depicted in side view in FIG. 1 consists of a COE truck 2 with a chassis 4 and a driver's cab 6 mounted on the forward part of the chassis. The chassis incorporates in a conventional manner components not depicted here in more detail, such as power transmission elements and various items that are necessary for the vehicle's propulsion. The chassis 4 comprises a skeleton or frame structure which may in a conventional manner be made of steel beams or be composed of structural elements similar to box girders. The chassis and the more detailed construction of the chassis frame are nevertheless of no crucial significance for the present invention. The truck relevant here is provided with a fixed cab, which means that the cab 6 is mounted untiltably relative to the chassis 4. The cab is also situated above the engine 7 (schematically depicted as a "block") which is supported by the chassis 4 of the vehicle 2 and which in this case may be regarded as fitted (suspended) in a special suspension arrangement 8 composed of beams, rods or other loadbearing elements. This special suspension arrangement 8 supporting the engine 7 is then fastened to the forward portion of the frame side members of the chassis 4, the front ends 10 of which are situated in the region of the vehicle's front wheels 12.

On each side of the vehicle 2 there is a panel 14 which is mounted pivotably on the chassis 4 and which in its normal position of use (see FIG. 2) forms part of the sidewall of the engine compartment and thereby limits access to the engine from the outside. The panel 14 is provided on its outside with three steps 16,18,20 (see FIGS. 2–4). The step panel 14 is mounted pivotably in the suspension arrangement 8 by means of a panel control arrangement which provides the panel with a movement displacing it from the normal position of use of the step panel (FIG. 2) by pivoting it outwards and rearwards in the longitudinal direction of the vehicle to an engine access position (see FIGS. 3–4). In this displaced position the panel 14 is situated directly alongside a side cover 22 to the wheel housing 24 of the front wheel 12. In its normal retracted position of use (FIG. 2) when the vehicle is in motion the step panel 14 is concealed by a cover 26 which is hinge-mounted on the chassis 4 in the region directly below the cab door 28 situated there.

The cab door 28 and the cover 26 below the door are detachably coupled together by a control arrangement 30 which absorbs relative motion. It is via this control arrangement that the opening/closing of the cover 26 is controlled by the movement of the cab door 28. The control arrangement 30 is designed to allow a certain relative motion between the door and the cover. This is necessary to compensate for the individual springing motion of the cab 6 (and hence the cab door 28) relative to the cover 26 hinge-mounted on the chassis. The relative motion absorbing control arrangement 30 is also required to compensate for different hingepin positioning on the door 28 and the cover 26. The hingepin of the cover 26 is preferably situated slightly forward of the hingepin of the door 28, as viewed in the forward direction of the vehicle and as depicted most clearly in FIG. 1b.

Figure 5:
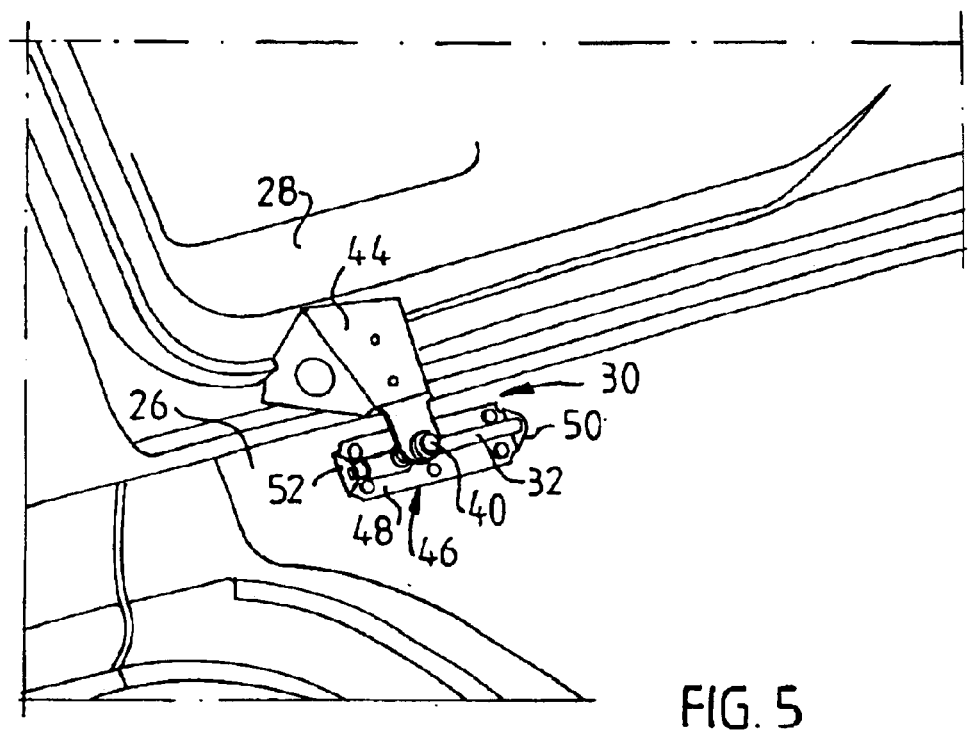
FIG. 5 depicts on a still larger scale a control arrangement which absorbs relative motion and by which the truck's cab door is releasably coupled to a cover outside the step panel.
Figure 6:
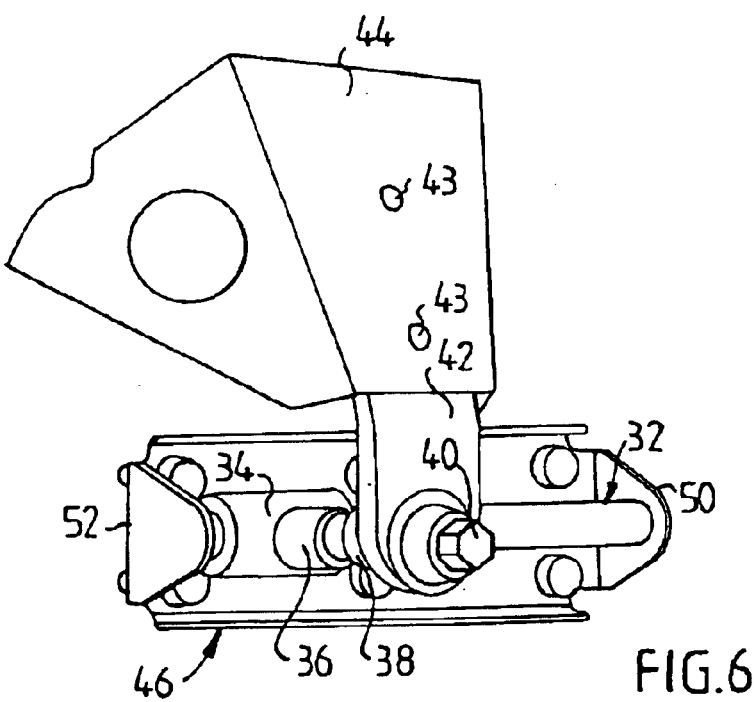
FIG. 6 depicts an enlarged detail of the control arrangement in FIG. 5.

The construction fastening and positioning of the control arrangement 30 relative to the door 28 and the cover 26 are depicted on a larger scale in FIGS. 5 and 6, which will now be referred to.

The control arrangement 30 incorporates a slide rod 32, which is connected securely to the cover 26, and a sleeve 34 which is mounted for rotation and longitudinal movement relative to the slide rod and which is connected to the cab door 28 by jointed connecting devices 36,38,40,42,44. The slide rod 32 is fitted in a bracket 46 which is fastened to the upper part of the cover 26 and which incorporates a bottom plate 48 which is screwed firmly to the door 26 and which has end flanges 50,52 between which the slide rod 32 is fastened. The sleeve 34 has an external lever arm 36 which is connected via a ball joint 38, a fastening screw 40 and a fastening element 42 to a bracket 44 which is fastened to the lower part of the cab door 28. The fastening element 42 is riveted securely (by rivets 43) to the bracket 44.

Figure 3:
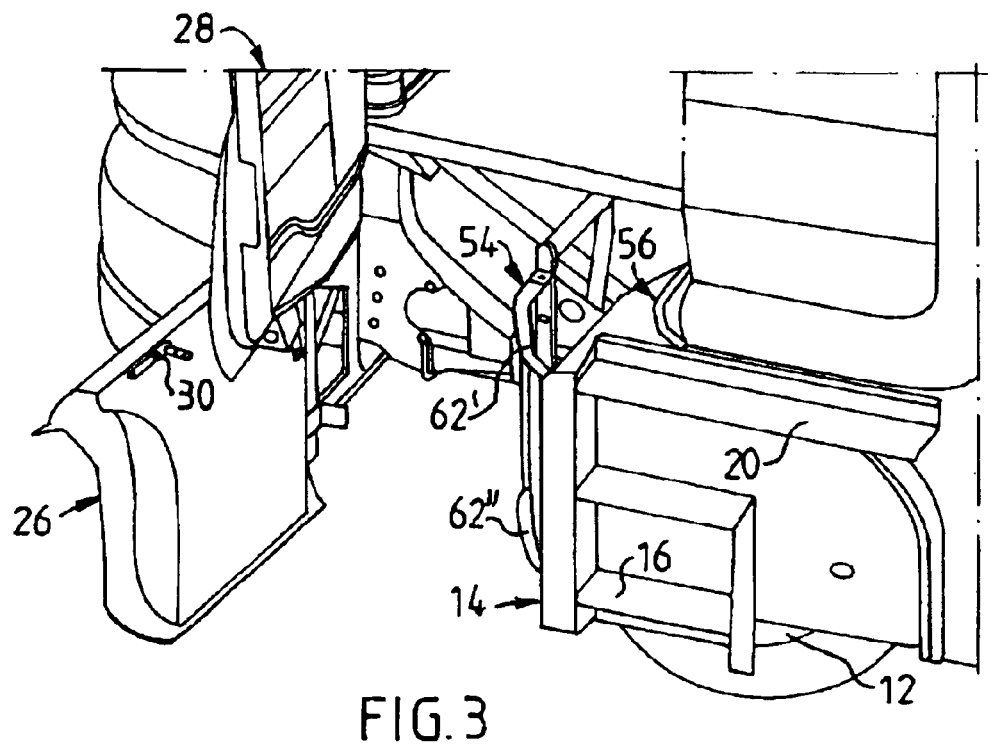
FIG. 3 depicts the same region of a truck as FIG. 2, but with the step panel displaced to a position alongside one of the truck's front wheels.
Figure 4:
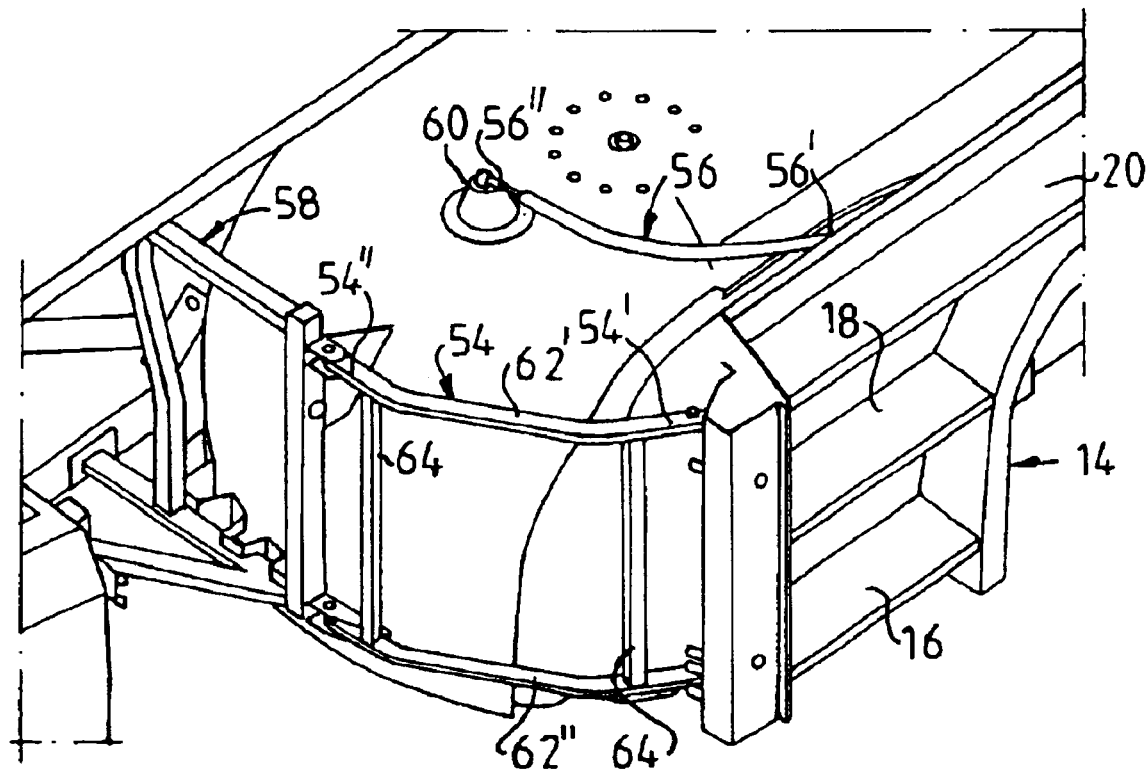
FIG. 4 depicts the step panel according to FIG. 3 viewed in a direction oblique to the wheel housing situated there.

A special type of panel control arrangement, the main parts of which are depicted in FIG. 4, is used for moving the step panel 14 from its normal retracted position of use (see FIG. 2) to its fully displaced position (see FIGS. 3 and 4) which provides unobstructed access to the vehicle's engine via the aperture created jointly by the opening of the cab door 28 and the cover 26 (see FIG. 3).

The desired displacement movement of the step panel 14 is achieved by using for each panel a panel control arrangement incorporating a four-joint mechanism with two hinge arms 54,56 which have their outer ends 54',56' attached pivotingly to the inside of the panel 14. The hinge arms' inner ends 54",56" are themselves attached pivotingly respectively to a framework 58 (connected to the chassis or the suspension arrangement 8) and a conical mounting 60. The mounting 60 is fastened on top of the wheel housing 24 of the front wheel 12.

To prevent the panel control arrangement becoming unsteady and unstable, the hinge arm 54 attached to the framework 58 takes the form of a gatelike unit incorporating two bent bars 62',62" which run parallel, are arranged substantially horizontally and are linked together by two vertically arranged parallel tiebars 64.

Figure 7:
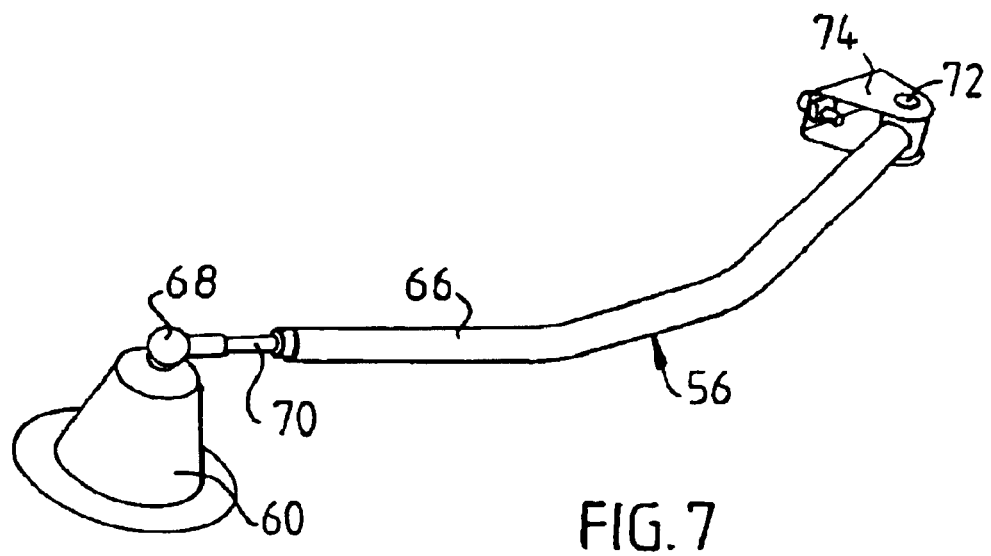
FIG. 7 depicts on a larger scale the guide arm which is mounted on the wheel housing and which forms part of the step panel control arrangement according to FIG. 4.

The step panel's other hinge arm 56 attached to the wheel housing consists, as indicated most clearly by FIG. 7, of a horizontally arranged bent rod 66, one end of which is attached to the conical mounting 60 by a setscrew 70 provided with a ball joint 68. The other end of the bent rod 66 is connected to the inside of the step panel 14 via a swivel 72 and a retaining yoke 74.

What is claimed is:

1. A freight vehicle, comprising:
    lateral sides;
    a chassis;
    an engine supported on the chassis to drive the vehicle;
    a driver's cab mounted to the chassis and above the engine, the driver's cab including at least one door;
    a compartment arranged on the chassis, the engine being disposed in the compartment, the compartment having lateral side adjacent to the lateral sides of the vehicle;
    a panel comprising at least one externally accessible step arranged on the panel to enable a user to climb to the driver's cab and arranged adjacent to at least one of the lateral sides of the vehicle and laterally delineating the compartment, the panel being pivotally mounted to the chassis to permit the panel to pivot laterally outward between a closed position enclosing the at least one lateral side of the compartment and an open position permitting access to the engine in the compartment;
    a cover pivotally mounted to the chassis and arranged below the door of the driver's cab; and
    a control arrangement detachably coupling the cover to the door of the driver's cab, wherein a movement of the door of the driver's cab controls a movement of the cover between a closed position concealing the panel and an open position revealing the panel.

2. The vehicle of claim 1, wherein the panel is pivotable rearwardly with respect to a longitudinal direction of the vehicle to provide access to the compartment.

3. The vehicle of claim 2, further comprising a panel control arrangement connected to the panel to control movement of the panel to the open position.

4. The vehicle of claim 1, wherein the chassis has a forward end; the vehicle further comprising:
    a frame arranged on the chassis, the frame including a forward end arranged adjacent to the forward end of the chassis; and
    a suspension arrangement arranged on the frame and supporting the engine.

5. The vehicle of claim 1, further comprising at least one externally accessible step arranged on the panel to enable a user to climb to the driver's cab; the cover being shaped and positioned so that the cover conceals the panel and the at least one step when the cover is in the closed position.

6. The vehicle of claim 1, further comprising a relative motion absorbing control arrangement detachably coupling the door to the cover, the absorbing control arrangement permitting relative movement between the door of the driver's cab and the cover to compensate for a springing of the driver's cab.

7. The vehicle of claim 6, wherein the door of the cab is hinge mounted to the cab at a first hinge position and the cover is hinge mounted to the chassis at a second hinge position arranged at a different location longitudinally along the vehicle than the first hinge position, the relative motion absorbing control arrangement permitting the door to pivot about the first hinge position and permitting the cover to pivot about the second hinge position.

8. The vehicle of claim 7, further comprising a first hinge mount hinge mounting the cab to the first hinge position and a second hinge mount hinge mounting the cover to the second hinge position, the first hinge mount including a first hinge pin, the second hinge mount including a second hinge pin situated forward of the first hinge pin along a longitudinal direction of the vehicle.

9. The vehicle of claim 7, wherein the control arrangement includes a slide rod secured to the cover and a sleeve connected to the door of the driver's cab, the sleeve receiving the slide rod therein, the sleeve and the slide rod being moveable with respect to each other; the control arrangement enabling relative movement between the door and the cover and relative movement between the slide rod and the sleeve.

10. The vehicle of claim 9, further comprising a bracket fastened to the cover, the slide rod being fitted in the bracket; the sleeve being supported for rotation and for longitudinal movement with respect to the slide rod.

11. The vehicle of claim 10, further comprising an external lever arm attached to the sleeve and a bracket fastened to the door of the cab and a ball joint and fastening element connected between the lever arm and the bracket to enable relative movement therebetween.

12. The vehicle of claim 9, further comprising a pivot frame pivotally connected to the chassis; the control arrangement including a four joint mechanism having first and second hinged arms spaced apart from one another, each hinged arm having an outer end pivotally attached to an inside of the panel, the first hinged arm having an inner end pivotally attached to the pivot frame.

13. The vehicle of claim 12, further comprising a wheel, a wheel housing to house the wheel, and a mounting fastened to the wheel housing, the wheel housing being located at a position having a longitudinal location that is the same as a longitudinal location of the panel, the outer end of the second hinged arm being connected to the mounting.

14. The vehicle of claim 12, wherein the first hinged arm includes two vertically separated, parallel bent bars extending substantially horizontally and parallel, substantially vertical tie bars linking the horizontal bent bars; the vehicle further comprising a wheel and a wheel housing to house the wheel, the wheel housing being located at a position having a longitudinal location that is the same as a longitudinal location of the panel, the second hinged arm including a bent rod arranged horizontally, the second hinged arm being attached to the wheel housing.

15. The vehicle of claim 1, wherein the cab is non-tiltable with respect to the chassis, the engine compartment and the panel.

16. A freight vehicle, comprising:

lateral sides;

a chassis;

an engine supported on the chassis to drive the vehicle;

a driver's cab mounted to the chassis and above the engine, the driver's cab including at least one door;

a compartment arranged on the chassis, the engine being disposed in the compartment, the compartment having lateral sides adjacent to the lateral sides of the vehicle;

a panel arranged adjacent to at least one of the lateral sides of the vehicle and laterally delineating the compartment, the panel being pivotally mounted to the chassis to permit the panel to pivot laterally outward between a closed position enclosing the at least one lateral side of the compartment and an open position permitting access to the engine in the compartment;

a cover pivotally mounted to the chassis and arranged below the door of the driver's cab, the cover being pivotable between a closed position concealing the panel and an open position revealing the panel; and a relative motion absorbing control arrangement detachably coupling the door to the cover, the absorbing control arrangement permitting relative movement between the door of the driver's cab and the cover to compensate for a springing of the driver's cab;

wherein the door of the cab is hinge mounted to the cab at a first hinge position and the cover is hinge mounted to the chassis at a second hinge position arranged at a different location longitudinally along the vehicle than the first hinge position, the relative motion absorbing control arrangement permitting the door to pivot about the first hinge position and permitting the cover to pivot about the second hinge position.

17. The vehicle of claim 16, further comprising a first hinge mount hinge mounting the cab to the first hinge position and a second hinge mount hinge mounting the cover to the second hinge position, the first hinge mount including a first hinge pin, the second hinge mount including a second hinge pin situated forward of the first hinge pin along a longitudinal direction of the vehicle.

18. The vehicle of claim 16, wherein the control arrangement includes a slide rod secured to the cover and a sleeve connected to the door of the driver's cab, the sleeve receiving the slide rod therein, the sleeve and the slide rod being moveable with respect to each other; the control arrangement enabling relative movement between the door and the cover and relative movement between the slide rod and the sleeve.

19. The vehicle of claim 18, further comprising a bracket fastened to the cover, the slide rod being fitted in the bracket; the sleeve being supported for rotation and for longitudinal movement with respect to the slide rod.

20. The vehicle of claim 19, further comprising an external lever arm attached to the sleeve and a bracket fastened to the door of the cab and a ball joint and fastening element connected between the lever arm and the bracket to enable relative movement therebetween.

21. The vehicle of claim 18, further comprising a pivot frame pivotally connected to the chassis; the control arrangement including a four joint mechanism having first and second hinged arms spaced apart from one another, each hinged arm having an outer end pivotally attached to an inside of the panel, the first hinged arm having an inner end pivotally attached to the pivot frame.

22. The vehicle of claim 21, further comprising a wheel, a wheel housing to house the wheel, and a mounting fastened to the wheel housing, the wheel housing being located at a position having a longitudinal location that is the same as a longitudinal location of the panel, the outer end of the second hinged arm being connected to the mounting.

23. The vehicle of claim 21, wherein the first hinged arm includes two vertically separated, parallel bent bars extending substantially horizontally and parallel, substantially vertical tie bars linking the horizontal bent bars; the vehicle further comprising a wheel and a wheel housing to house the wheel, the wheel housing being located at a position having a longitudinal location that is the same as a longitudinal location of the panel, the second hinged arm including a bent rod arranged horizontally, the second hinged arm being attached to the wheel housing.

24. The vehicle of claim 16, wherein the cab is non-tiltable with respect to the chassis, the engine compartment and the panel.

* * * * *